United States Patent
Jeon et al.

(10) Patent No.: US 10,479,864 B2
(45) Date of Patent: Nov. 19, 2019

(54) METHOD FOR MANUFACTURING POLYAMIDE-BASED WATER-TREATMENT SEPARATOR HAVING EXCELLENT PERMEATION FLUX CHARACTERISTICS AND WATER-TREATMENT SEPARATOR MANUFACTURED BY SAME

(71) Applicant: LG CHEM, LTD., Seoul (KR)

(72) Inventors: Byungho Jeon, Daejeon (KR); Hyuin Ryu, Daejeon (KR); Keun Won Song, Daejeon (KR); Chong Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 145 days.

(21) Appl. No.: 15/511,998

(22) PCT Filed: Sep. 9, 2015

(86) PCT No.: PCT/KR2015/009495
§ 371 (c)(1),
(2) Date: Mar. 16, 2017

(87) PCT Pub. No.: WO2016/052880
PCT Pub. Date: Apr. 7, 2016

(65) Prior Publication Data
US 2017/0291990 A1    Oct. 12, 2017

(30) Foreign Application Priority Data
Sep. 30, 2014    (KR) .................... 10-2014-0132125

(51) Int. Cl.
| | | |
|---|---|---|
| *C08G 69/26* | (2006.01) | |
| *B01D 71/06* | (2006.01) | |
| *C02F 1/44* | (2006.01) | |
| *C08J 3/09* | (2006.01) | |
| *B01D 61/02* | (2006.01) | |
| *B01D 69/12* | (2006.01) | |
| *B01D 71/56* | (2006.01) | |

(52) U.S. Cl.
CPC ............. *C08G 69/26* (2013.01); *B01D 61/02* (2013.01); *B01D 69/125* (2013.01); *B01D 71/06* (2013.01); *B01D 71/56* (2013.01); *C02F 1/44* (2013.01); *C08J 3/092* (2013.01); *B01D 2323/00* (2013.01); *B01D 2325/20* (2013.01)

(58) Field of Classification Search
CPC .................... B01D 71/56; C08G 69/26
See application file for complete search history.

(56) References Cited

U.S. PATENT DOCUMENTS

| | | | | |
|---|---|---|---|---|
| 5,733,602 A | * | 3/1998 | Hirose | B01D 69/125 427/245 |
| 6,015,495 A | * | 1/2000 | Koo | B01D 39/16 210/490 |
| 6,368,507 B1 | * | 4/2002 | Koo | B01D 69/125 210/490 |
| 7,479,300 B2 | | 1/2009 | Koo | |
| 9,211,507 B2 | | 12/2015 | Kim | |
| 2004/0222146 A1 | * | 11/2004 | Hirose | B01D 69/125 210/490 |
| 2006/0219628 A1 | * | 10/2006 | Koo | B01D 67/0006 210/500.38 |
| 2007/0039874 A1 | | 2/2007 | Kniajanski | |
| 2011/0174723 A1 | * | 7/2011 | Kawaguchi | B01D 69/02 210/490 |
| 2013/0112619 A1 | | 5/2013 | Livingston | |
| 2014/0199483 A1 | * | 7/2014 | Roy | B01D 69/125 427/244 |
| 2014/0299537 A1 | | 10/2014 | Kim et al. | |

FOREIGN PATENT DOCUMENTS

| | | |
|---|---|---|
| JP | 2001-179061 A | 7/2001 |
| JP | 2006-281207 A | 10/2006 |
| JP | 2014-509562 A | 4/2014 |
| KR | 10-1998-020428 A | 6/1998 |
| KR | 10-2004-0095185 A | 11/2004 |
| KR | 10-0715454 B1 | 5/2007 |
| KR | 10-2013-0027787 A | 3/2013 |
| KR | 10-2014-0005489 A | 1/2014 |
| KR | 10-2014-0065360 A | 5/2014 |
| KR | 10-2014-0085373 A | 7/2014 |
| WO | 2014/014669 A1 | 1/2014 |

OTHER PUBLICATIONS

NIH Toxnet Diethylene glycol dimethyl ether Entry. Toxicology Data Network. US National Library of Medicine. Evidentiary Reference. (Year: 2019).*

Merck Index Diglyme Entry. The Merck Index Online. Royal Society of Chemistry. Evidentiary Reference. (Year: 2019).*

* cited by examiner

*Primary Examiner* — Michael M Dollinger
(74) *Attorney, Agent, or Firm* — Dentons US LLP

(57) ABSTRACT

The present invention relates to a method for manufacturing a water treatment separation membrane, the method including: forming an aqueous solution layer including an amine compound on a porous support; and bringing an organic solution including an acyl halide compound into contact with on the aqueous solution layer to form a polyamide active layer, in which the organic solution includes a non-polar solvent and an amphiphilic solvent having a boiling point of 120° C. or more, thereby improving a permeation flux, and a water treatment separation membrane manufactured by the manufacturing method.

2 Claims, No Drawings

METHOD FOR MANUFACTURING POLYAMIDE-BASED WATER-TREATMENT SEPARATOR HAVING EXCELLENT PERMEATION FLUX CHARACTERISTICS AND WATER-TREATMENT SEPARATOR MANUFACTURED BY SAME

TECHNICAL FIELD

This application is the National Stage entry of International Application No. PCT/KR2015/009495 filed Sep. 9, 2015 and claims priority to and the benefit of Korean Patent Application No. 10-2014-0132125 filed in the Korean Intellectual Property Office on Sep. 30, 2014, the entire contents of which are incorporated herein by reference.

The present invention relates to a method for manufacturing a polyamide-based water treatment separation membrane and a water treatment separation membrane manufactured by using the same, and more particularly, to a method for manufacturing a water treatment separation membrane including a polyamide active layer through an interfacial polymerization of an amine compound and an acyl halide compound and a water treatment separation membrane manufactured by the manufacturing method.

BACKGROUND ART

Developing a new source of water resources has emerged as an urgent facing problem due to recent serious pollution of water quality environments and water shortage. Studies on the pollution of water quality environments aim for high-quality residential and industrial water, and treatment of various domestic sewage and industrial wastewater, and interests in water treatment processes using a separation membrane having an advantage of energy saving have been rising. Further, accelerated reinforcement on environment regulations is expected to advance activation of separation membrane technologies. It is difficult for traditional water treatment processes to satisfy the tightened regulations, but separation membrane technologies secure excellent treatment efficiency and stable treatment, and accordingly, are expected to become a leading technology in the field of water treatment in the future.

Liquid separation is divided into micro filtration, ultra filtration, nano filtration, reverse osmosis, stannizing, active transport, electrodialysis, and the like, depending on the pore of the membrane. Among them, the reverse osmosis method refers to a process of performing desalination work by using a semi-permeable membrane which permeates water, but shows impermeability to salts, and when high pressure water in which salts are dissolved is introduced into one surface of the semi-permeable membrane, pure water from which salts have been removed is released into the other surface at low pressure.

Recently, water on a scale of approximately one billion gal/day has been subjected to a desalination process through the reverse osmosis method, and since a first desalination process using reverse osmosis was published in the 1930's, numerous studies on semi-permeable membrane materials in this field have been carried out. Among them, what is mainly used due to the commercial success of the reverse osmosis method is a cellulose-based asymmetric membrane and a polyamide-based composite membrane. Cellulose-based membranes developed in the initial phase of the reverse osmosis membrane have recently tended to be rarely used due to various disadvantages in that the operable pH range is narrow, the membranes are deformed at high temperature, lots of costs required for operation are needed due to the use of high pressure, the membranes are vulnerable to microbes, and the like.

Meanwhile, polyamide-based composite membranes are manufactured by a method of forming a polysulfone layer on a non-woven fabric to form a microporous support, immersing the microporous support in an aqueous solution of m-phenylene diamine (hereinafter, referred to as mPD) to form an mPD layer, immersing the microporous support again in an organic solvent of trimesoyl chloride (hereinafter, referred to as TMC) or coating the microporous support with the organic solvent to bring the mPD layer into contact with TMC, and performing an interfacial polymerization to form a polyamide layer. By bringing a non-polar solution into contact with a polar solution, the polymerization occurs only at the interface thereof, and accordingly, a polyamide layer having a very small thickness is formed. The polyamide-based composite membranes are highly stable against a change in pH, can be operated at low pressure, and have an excellent salt rejection rate, as compared to the existing cellulose-based asymmetric membranes, and accordingly, the polyamide-based composite membranes are currently in the mainstream of water treatment separation membranes.

Meanwhile, there are several conditions required for commercially using the water treatment separation membranes, and one of the conditions is that the water treatment separation membranes need to have a high salt rejection rate. The salt rejection rate commercially required for the water treatment separation membrane is at least 97% or more based on the brackish water. Examples of the other important properties of the water treatment separation membranes include an ability to allow a relatively large amount of water to pass through the membrane even at relatively low pressure, that is, high flux characteristics. However, since the salt rejection rate and the permeation flux characteristics have conflicting properties, there are actually many difficulties in manufacturing a water treatment separation membrane having excellent salt rejection rate and permeation flux.

TECHNICAL PROBLEM

The present invention has been made in an effort to provide a method for manufacturing a polyamide-based water treatment separation membrane having a significantly improved permeation flux by using a mixture of an acyl halide compound with an organic solution including a non-polar solvent and an amphiphilic solvent having a boiling point of 120° C. or more in a process of polymerizing a polyamide active layer.

TECHNICAL SOLUTION

An exemplary embodiment of the present specification provides a method for manufacturing a water treatment separation membrane, the method including: forming an aqueous solution layer including an amine compound on a porous support; and bringing an organic solution including an acyl halide compound into contact with on the aqueous solution layer to form a polyamide active layer, in which the organic solution includes a non-polar solvent and an amphiphilic solvent having a boiling point of 120° C. or more.

According to an exemplary embodiment of the present specification, the non-polar solvent may be a hydrocarbon solvent having 6 to 13 carbon atoms.

According to an exemplary embodiment of the present specification, the amphiphilic solvent may have a solubility of 4.5 g to 200 g per 100 g of water.

According to an exemplary embodiment of the present specification, the amphiphilic solvent may have a vapor pressure of 0.02 torr to 12 torr at 25° C.

According to an exemplary embodiment of the present specification, it is preferred that the amphiphilic solvent includes acetate, ester, ether, or a ketone group.

According to an exemplary embodiment of the present specification, it is preferred that the amphiphilic solvent is derived from a glycol having 3 or more carbon atoms.

According to an exemplary embodiment of the present specification, it is preferred that the amphiphilic solvent is represented by the following Chemical Formula 1.

[Chemical Formula 1]

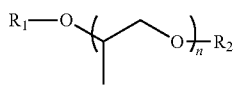

In Chemical Formula 1, $R_1$ is hydrogen, a $C_{1-4}$ alkyl group or a $C_{1-4}$ alkylcarbonyl group, $R_2$ is a $C_{1-4}$ alkyl group or a $C_{1-4}$ alkylcarbonyl group, and n is an integer of 1 to 3.

According to an exemplary embodiment of the present specification, the amphiphilic solvent may include one or more selected from the group consisting of propylene glycol monomethyl ether acetate, dipropylene glycol monomethyl ether, propylene glycol neobutyl ether, dipropylene glycol neobutyl ether, dipropylene glycol monomethyl ether acetate, tripropylene glycol methyl ether, and 1,3-butanediol diacetate.

According to an exemplary embodiment of the present specification, the amphiphilic solvent may be included in an amount of 0.05 vol % to 10 vol % based on the total organic solution.

Another exemplary embodiment of the present specification provides a water treatment separation membrane manufactured by the manufacturing method.

According to an exemplary embodiment of the present specification, the water treatment separation membrane may have an initial salt rejection rate of 95% or more and an initial permeation flux of 40 gallon/ft$^2$ day or more when a sodium chloride (NaCl) solution having a concentration of 32,000 ppm is passed through the water treatment separation membrane at a pressure of 800 psi.

Still another exemplary embodiment of the present specification provides a water treatment module including the one or more water treatment separation membranes.

Yet another exemplary embodiment of the present specification provides a water treatment apparatus including the one or more water treatment modules.

Advantageous Effects

According to an exemplary embodiment of the present specification, in the bringing of an aqueous solution layer including an amine compound into contact with an organic solution including an acyl halide compound to form a polyamide active layer, a water treatment separation membrane having an excellent permeation flux may be manufactured by including an amphiphilic solvent having a boiling point of 120° C. or more in the organic solution.

BEST MODE

Hereinafter, the present specification will be described in more detail.

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

As a result of repeated studies for developing a water treatment separation membrane having excellent salt rejection rate and permeation flux characteristics, the present inventors have found that when a polyamide active layer is formed by forming an amine compound aqueous solution layer on a support, and bringing an organic solution including an acyl halide compound into contact with on the aqueous solution layer, in a case where an amphiphilic solvent having a boiling point of 120° C. or more is included in the organic solution, it is possible to obtain a water treatment separation membrane having excellent salt rejection rate and particularly significantly improved permeation flux characteristics, thereby completing the present invention.

More specifically, an exemplary embodiment of the present invention provides a method for manufacturing a water treatment separation membrane, the method including: forming an aqueous solution layer including an amine compound on a porous support; and bringing an organic solution including an acyl halide compound into contact with on the aqueous solution layer to form a polyamide active layer, in which the organic solution includes a nonpolar solvent and an amphiphilic solvent having a boiling point of 120° C. or more.

According to an exemplary embodiment of the present specification, in the forming of the aqueous solution layer including the amine compound on the porous support, as the porous support, a porous support in which a coating layer formed of a polymer material is formed on a non-woven fabric may be used, and as the polymer material, it is possible to use, for example, polysulfone, polyethersulfone, polycarbonate, polyethylene oxide, polyimide, polyetherimide, polyether ether ketone, polypropylene, polymethylpentene, polymethyl chloride, polyvinylidene fluoride, and the like, but the polymer material is not necessarily limited thereto. Among them, polysulfone is particularly preferred.

In this case, according to an exemplary embodiment of the present specification, the amine compound is not limited in kind as long as the amine compound is an amine compound used for manufacturing a water treatment separation membrane, but as a few preferred examples thereof, m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine or mixtures thereof is preferred.

According to an exemplary embodiment of the present specification, a method for forming an aqueous solution layer including an amine compound on a porous support is not particularly limited, and may be suitably used even for the present invention as long as the method is a method capable of forming an aqueous solution layer on a support, and examples thereof include spraying, application, immersion, dropping, and the like.

According to an exemplary embodiment of the present specification, the aqueous solution layer may be additionally subjected to removing an excess aqueous solution including an amine compound, if necessary. The aqueous solution layer formed on the porous support may be non-uniformly distributed when the aqueous solution present on the porous support is present in an excessive amount, and when the aqueous solution is non-uniformly distributed, a non-uniform polyamide active layer may be formed by a subsequent interfacial polymerization. Accordingly, after the aqueous solution layer is formed on the support, it is preferred to remove an excess aqueous solution. The removal of the excess aqueous solution is not particularly limited, but may be performed by using, for example, a sponge, an air knife, a nitrogen gas blowing, natural drying, or a compression roll, and the like.

Next, according to an exemplary embodiment of the present specification, the bringing of the organic solution including the acyl halide compound into contact with on the aqueous solution layer to form the polyamide active layer is performed. In this case, the present invention is characterized in that the organic solution includes a non-polar solvent and an amphiphilic solvent having a boiling point of 120° C. or more.

According to an exemplary embodiment of the present specification, the forming of the polyamide active layer is subjected to a process of producing polyamide by an interfacial polymerization while reacting the amine compound and the acyl halide compound coated on the surface thereof, and then a thin film is formed while the produced polyamide is adsorbed onto a microporous support.

According to an exemplary embodiment of the present specification, when an amphiphilic solvent having a boiling point of 120° C. or more is used as in the present invention, a layer (miscible phase) in which two solutions may co-exist at the interface between an aqueous solution including an amine compound and an organic solution is formed. The amine compound and the acyl halide compound primarily rapidly react with each other in the miscible phase to form a polyamide structure having a large curvature. Thereafter, an amine compound and acyl halide slowly secondarily react with each other at the interface below the structure having a large curvature to form relatively uniform micro protrusions, and as a result, a gently and widely spread polyamide active layer is formed. Consequently, a polyamide having a large curvature is formed on a polyamide having a small curvature to increase the surface area, and as a result, the permeation flux is increased.

According to an exemplary embodiment of the present specification, in the method of bringing the organic solution including an acyl halide compound into contact with on the aqueous solution layer, a polyamide active layer may also be formed by a method such as immersion, spraying, or coating.

According to an exemplary embodiment of the present specification, the organic solution including the acyl halide compound may additionally include leaving only the organic solution to stand at normal temperature before the bringing of the organic solution including the acyl halide compound into contact with on the aqueous solution layer to form the polyamide active layer.

Specifically, according to an exemplary embodiment of the present specification, the leaving of only the organic solution to stand at normal temperature may be carried out for 10 minutes to 100 minutes, or may be carried out for 20 minutes to 70 minutes, and may be carried out for more preferably 30 minutes to 60 minutes.

According to an exemplary embodiment of the present specification, when an amphiphilic solvent having a boiling point of 120° C. or more is used in the organic solution including the acyl halide compound, even though only the organic solution is left to stand before the bringing of the organic solution into contact with on the aqueous solution layer, as described above, there is an effect in that a deterioration in performance, such as a decrease in permeation flux characteristics of a water treatment separation membrane as the amount of amphiphilic solvent in the organic solution is decreased, is relatively slight.

In contrast, when an amphiphilic solvent having a boiling point of less than 120° C. is used in the organic solution including the acyl halide compound, there may occur a deterioration in performance of a membrane, such as a decrease in permeation flux characteristics of a finally manufactured water treatment separation membrane due to a decrease in an amount by evaporation of the amphiphilic solvent in the organic solution when only the organic solution is left to stand before the bringing of the organic solution into contact with on the aqueous solution layer.

According to an exemplary embodiment of the present specification, the acyl halide compound may be, for example, a mixture of one or more selected from the compound group consisting of trimesolyl chloride, isophthaloyl chloride, and terephthaloyl chloride as an aromatic compound having 2 to 3 carboxylic acid halides, but is not limited thereto.

Meanwhile, according to an exemplary embodiment of the present specification, it is preferred to include a non-polar solvent and an amphiphilic solvent having a boiling point of 120° C. or more as an organic solvent for the solution including the acyl halide compound.

According to an exemplary embodiment of the present specification, the non-polar solvent is sufficient as long as the non-polar solvent is a solvent which is usually used in a method of preparing a polyamide active layer in the related art, and it is preferred to use a solvent which does not participate in an interfacial polymerization reaction, does not cause a chemical bond with an acyl halide compound, and does not impair a porous supporting layer.

According to an exemplary embodiment of the present specification, as the non-polar solvent, a hydrocarbon solvent having 6 to 13 carbon atoms may be used, but the non-polar solvent is not limited thereto. Examples of the non-polar solvent include one or more selected from the group consisting of hexane, heptane, octane, nonane, decane, undecane, dodecane, and an isoparaffin-based solvent which is an alkane mixture material having 6 to 13 carbon atoms, and specifically, isopar C, isopar G, isopar E (Exxon), ISOL-C(SK Chem) or ISOL-G (Exxon), and the like may be used, but the non-polar solvent is not limited thereto.

Next, according to an exemplary embodiment of the present specification, the amphiphilic solvent used in the present invention has a boiling point of preferably 120° C. or more, and more preferably 150° C. or more. More specifically, in consideration of conditions that the non-polar organic solvent is dried in the manufacturing process, it is also preferred to select an amphiphilic solvent having a boiling point which is similar to that of the non-polar organic solvent.

According to an exemplary embodiment of the present specification, the amphiphilic solvent has a solubility of preferably 4.5 g to 200 g, and more preferably 10 g to 50 g or 10 g to 30 g per 100 g of water. When the solubility of the amphiphilic solvent to water satisfies the range, the amphiphilic solvent easily diffuses up and down through an organic solution layer and an aqueous solution layer, and as a result, a layer (miscible phase) in which the two solutions may co-exist may be easily formed, and in consideration of the miscibility with a non-polar solvent, for a chemical species having an extremely high solubility to water, the miscibility with a non-polar solvent deteriorates, and when the amphiphilic solvent has a low solubility to water, the composition ratio of the amphiphilic solvent is limited.

According to an exemplary embodiment of the present specification, the amphiphilic solvent has a vapor pressure of preferably 0.02 torr to 12 torr, and more preferably 0.7 torr to 3.5 torr at 25° C. A non-polar solvent has a vapor pressure of approximately 1.46 torr at 25° C., and accordingly, when the acyl halide compound and the amphiphilic solvent are mixed in the non-polar solvent, the composition of the organic solution may be changed over time due to the difference between the degrees to which the amphiphilic solvent and the non-polar solvent are volatilized at normal temperature in the case where the vapor pressures thereof are significantly different from each other. Further, in the case where the amphiphilic solvent to be added has a vapor pressure which is similar to that of the non-polar solvent, there is an advantage in the process in that oil vapors generated in the drying process may be treated together.

According to an exemplary embodiment of the present specification, it is preferred that the amphiphilic solvent of the present invention includes acetate, ester, ether, or a ketone group. The functional group is formed at a portion of a compound composed of carbon chains, and thus functions to allow the solvent to have the hydrophilicity.

According to an exemplary embodiment of the present specification, it is further preferred that the amphiphilicity of the present invention is an ether-based compound through the reaction between diols and an acetate-based compound through the reaction between diol and carboxylic acid.

According to an exemplary embodiment of the present specification, it is preferred that the amphiphilic solvent is derived from a glycol having 3 or more carbon atoms. In the case of an amphiphilic solvent derived from a glycol having 2 or less carbon atoms, the boiling point and solubility may not be sufficiently satisfied.

According to an exemplary embodiment of the present specification, as the diol, it is preferred to use a glycol having 3 or more carbon atoms, and more specifically, it is preferred that the diol is at least one selected from the group consisting of 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, dipropylene glycol, and polypropylene glycol, but the diol is not limited thereto.

According to an exemplary embodiment of the present specification, it is preferred that the amphiphilic solvent is represented by the following Chemical Formula 1.

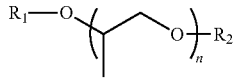

[Chemical Formula 1]

$R_1$ is hydrogen, a $C_{1-4}$ alkyl group or a $C_{1-4}$ alkylcarbonyl group, $R_2$ is a $C_{1-4}$ alkyl group or a $C_{1-4}$ alkylcarbonyl group, and n is an integer of 1 to 3.

More specifically, according to an exemplary embodiment of the present specification, it is preferred that the amphiphilic solvent is at least one selected from the group consisting of, for example, propylene glycol monomethyl ether acetate, dipropylene glycol monomethyl ether, propylene glycol n-butyl ether, dipropylene glycol n-butyl ether, dipropylene glycol monomethyl ether acetate, tripropylene glycol methyl ether, and 1,3-butanediol diacetate, but the amphiphilic solvent is not limited thereto.

According to an exemplary embodiment of the present specification, the amphiphilic solvent may be included in an amount of preferably 0.05 vol % to 10 vol %, more preferably 0.1 vol % to 5 vol %, even more preferably 0.1 vol % to 3 vol %, and even still more preferably 0.1 vol % to 1 vol %, based on the total organic solution including an acyl halide compound. According to an exemplary embodiment of the present specification, when the content of the amphiphilic solvent satisfies the range, it is possible to maintain the salt rejection rate of high performance and significantly improve a permeation flux.

According to an exemplary embodiment of the present specification, when a polyamide active layer is formed on a porous support by the method as described above, a process of selectively drying and washing the polyamide active layer may be carried out. In this case, it is preferred that the drying is carried out in an oven at 45° C. to 80° C. for 1 minute to 10 minutes. In addition, the washing is not particularly limited, but for example, the washing may be carried out in an aqueous basic solution. An available aqueous basic solution is not particularly limited, but for example, an aqueous sodium carbonate solution may be used, and specifically, it is preferred that the washing is carried out in an aqueous sodium carbonate solution at 20° C. to 30° C. for 1 hour to 24 hours.

Meanwhile, according to an exemplary embodiment of the present specification, the polyamide active layer has a thickness of preferably 100 nm to 200 nm, more preferably 110 nm to 180 nm, and most preferably 130 nm to 150 nm.

That is, according to an exemplary embodiment of the present specification, the polyamide active layer has a very high roughness, and accordingly, when the polyamide active layer has a thickness of 100 nm or more, there is an effect in that the porous support may be entirely coated, and when the polyamide active layer has a thickness of 200 nm or less, there is an effect in that the polyamide active layer may be uniformly formed.

Another exemplary embodiment of the present specification provides a water treatment separation membrane manufactured by the above-described method for manufacturing a water treatment separation membrane.

In the water treatment separation membrane, the above-described contents may be equally applied to the description on the respective constituent elements.

According to an exemplary embodiment of the present specification, it is preferred that the water treatment separation membrane has an initial salt rejection rate of 95% or more and an initial permeation flux of 40 gallon/ft² day or more when a sodium chloride (NaCl) solution having a concentration of 32,000 ppm is passed through the separation membrane at a pressure of 800 psi.

According to an exemplary embodiment of the present specification, the water treatment separation membrane including the constituent elements may be used as a microfiltration membrane, an ultrafiltration membrane, a nanofiltration membrane, or a reverse osmosis membrane, and the like, and particularly preferably, the water treatment separation membrane may be used as a reverse osmosis membrane.

Still another exemplary embodiment of the present specification relates to a water treatment module including at least one or more of the above-described water treatment separation membranes.

According to an exemplary embodiment of the present specification, the specific kind of water treatment module is not particularly limited, and examples thereof include a plate & frame module, a tubular module, a hollow & fiber module, or a spiral wound module, and the like. Furthermore, the other constitutions, manufacturing methods thereof, and the like are not particularly limited as long as the water treatment module of the present invention includes the above-described water treatment separation membrane of the present invention, and a general means publicly known in this field may be adopted without limitation.

According to an exemplary embodiment of the present specification, the water treatment module has excellent salt rejection rate and permeation flux and excellent chemical stability, and thus may be usefully used in a water treatment apparatus such as a domestic/industrial water purification apparatus, a sewage treatment apparatus, and a sea and fresh water treatment apparatus.

MODE FOR INVENTION

Hereinafter, the present invention will be described in more detail through more specific Examples.

Example 1

18 wt % of a polysulfone solid content was put into an N,N-dimethylformamide (DMF) solution, and the resulting mixture was dissolved at 80° C. to 85° C. for 12 hours or more to obtain a uniform liquid phase. The solution was cast to a thickness of 45 μm to 50 μm on a polyester non-woven fabric having a thickness of 95 μm to 100 μm. And then, the cast non-woven fabric was put into water to manufacture a porous polysulfone support.

The porous polysulfone support manufactured by the method was dipped into an aqueous solution including 2 wt % of metaphenylenediamine, 1 wt % of triethylamine, and 2.3 wt % of camphorsulfonic acid for 2 minutes and taken out, and then an excess aqueous solution on the support was removed by using a 25 psi roller, and the support was dried at normal temperature for 1 minute.

And then, 0.2 vol % of propylene glycol monomethyl ether acetate (boiling point: 145° C., solubility: 18 g/100 g) being an amphiphilic solvent was added to Isopar G (manufactured by Exxon Mobile Inc.) being a non-polar solvent, 0.2 vol % of trimesoyl chloride (TMC) being an acyl halide compound was added thereto to prepare an organic solution, and then the organic solution was applied onto the surface of the coated support to initiate an interfacial polymerization reaction. Thereafter, the support was dried in an oven at 60° C. for 10 minutes.

The water treatment separation membrane obtained by the method was immersed in 0.2 wt % of an aqueous sodium carbonate solution for 2 hours or more, and then the water treatment separation membrane was washed again with distilled water for 1 minute to manufacture a water treatment separation membrane having a polyamide active layer.

Example 2

A water treatment separation membrane was manufactured in the same manner as in Example 1, except that 0.5 vol % of propylene glycol monomethyl ether acetate (boiling point: 145° C., solubility: 18 g/100 g) being an amphiphilic solvent was added to prepare an organic solution.

Example 3

A water treatment separation membrane was manufactured in the same manner as in Example 1, except that 0.7 vol % of propylene glycol monomethyl ether acetate (boiling point: 145° C., solubility: 18 g/100 g) being an amphiphilic solvent was added to prepare an organic solution.

Example 4

A water treatment separation membrane was manufactured in the same manner as in Example 1, except that 1.0 vol % of propylene glycol monomethyl ether acetate (boiling point: 145° C., solubility: 18 g/100 g) being an amphiphilic solvent was added to prepare an organic solution.

Example 5

A water treatment separation membrane was manufactured in the same manner as in Example 1, except that 20.0 vol % of propylene glycol monomethyl ether acetate (boiling point: 145° C., solubility: 18 g/100 g) being an amphiphilic solvent was added to prepare an organic solution.

Example 6

A water treatment separation membrane was manufactured in the same manner as in Example 1, except that 1 vol % of propylene glycol monomethyl ether acetate (boiling point: 145° C., solubility: 18 g/100 g) being an amphiphilic solvent was added to prepare an organic solution, and then the organic solution was left to stand at normal temperature for 60 minutes.

Comparative Example 1

A water treatment separation membrane was manufactured in the same manner as in Example 1, except that when the organic solution was prepared, propylene glycol monomethyl ether acetate being an amphiphilic solvent was not added.

Comparative Example 2

A water treatment separation membrane was manufactured in the same manner as in Example 1, except that 0.5 vol % of propylene glycol monomethyl ether acetate (boiling point: 145° C., solubility: 18 g/100 g) being an amphiphilic solvent was added to not Isopar G (manufactured by Exxon Mobile Inc.) being a non-polar solvent, but an aqueous solution including 2 wt % of metaphenylenediamine, 1 wt % of triethylamine, and 2.3 wt % of camphorsulfonic acid.

Comparative Example 3

A water treatment separation membrane was manufactured in the same manner as in Example 1, except that 1 vol % of acetone (boiling point: 56° C.) being an amphiphilic solvent was added to prepare an organic solution.

Comparative Example 4

A water treatment separation membrane was manufactured in the same manner as in Example 1, except that 0.5 vol % of tetrahydrofuran (THF) (boiling point: 65° C.) being an amphiphilic solvent was added to prepare an organic solution.

Comparative Example 5

A water treatment separation membrane was manufactured in the same manner as in Example 1, except that 0.75 vol % of methyl ethyl ketone (MEK) (boiling point: 79.64° C.) being an amphiphilic solvent was added to prepare an organic solution.

Comparative Example 6

A water treatment separation membrane was manufactured in the same manner as in Example 1, except that 1 vol % of acetone (boiling point: 56° C.) being an amphiphilic solvent was added to prepare an organic solution, and then the organic solution was left to stand at normal temperature for 60 minutes.

Experimental Example 1—Measurement of Initial Salt Rejection Rates and Initial Permeation Flux The initial salt rejection rates and the initial permeation fluxes of the water treatment separation membranes manufactured in Examples 1 to 6 and Comparative Examples 1 to 6 were evaluated by the following method.

The initial salt rejection rates and the initial permeation fluxes were measured while an aqueous sodium chloride solution having a concentration of 32,000 ppm at 25° C. was supplied at a flux of 4,500 mL/min. The water treatment separation membrane cell apparatus used in the evaluation of the membrane was equipped with a flat plate-type permeation cell, a high pressure pump, a reservoir, and a cooling apparatus, the structure of the flat plate-type permeation cell was in a cross-flow mode, and the effective permeation area was 28 cm². The washed water treatment separation membrane was mounted on the permeation cell, and then for the stabilization of the evaluation equipment, the equipment was sufficiently pre-operated for approximately 1 hour by using tertiary distilled water. And then, the aqueous sodium chloride solution was replaced with an aqueous sodium chloride solution having a concentration of 32,000 ppm to operate the equipment for approximately 1 hour until the pressure and the permeation flux reached the steady state, and then the flux was calculated by measuring the amount of water permeated for 10 minutes, and the salt rejection rate was calculated by using a conductivity meter to analyze the concentration of salts before and after the permeation.

The results of measuring the initial salt rejection rates and the initial permeation fluxes of the water treatment separation membranes manufactured in Examples 1 to 5 and Comparative Examples 1 to 5 are shown in the following [Table 1].

TABLE 1

| Classification | Non-polar solvent | Amphiphilic solvent (vol %) | Salt rejection rate (%) | Permeation flux (gallon/ft² · day) |
|---|---|---|---|---|
| Example 1 | Isopar G | PGMEA (0.2) | 99.13 | 43.24 |
| Example 2 | Isopar G | PGMEA (0.5) | 99.09 | 47.43 |
| Example 3 | Isopar G | PGMEA (0.7) | 99.07 | 49.75 |
| Example 4 | Isopar G | PGMEA (1.0) | 99.05 | 52.15 |
| Example 5 | Isopar G | PGMEA (20) | 12.82 | 153.14 |
| Comparative Example 1 | Isopar G | — | 99.31 | 37.42 |
| Comparative Example 2 | — (aqueous solution) | PGMEA (0.5) | 98.96 | 39.09 |
| Comparative Example 3 | Isopar G | Acetone (1.0) | 99.06 | 42.42 |
| Comparative Example 4 | Isopar G | THF (0.5) | 98.97 | 47.73 |
| Comparative Example 5 | Isopar G | MEK (0.75) | 99.16 | 35.06 |

From the results of Table 1, when Examples 1 to 4 were compared with Comparative Example 1, it could be confirmed that in the case where an amphiphilic solvent was further included in an organic solution, the permeation fluxes were significantly improved while the salt rejection rates are similar to each other.

Meanwhile, when Example 5 was reviewed, it could be confirmed that when the content of the amphiphilic solvent was out of a range of 0.05 vol % to 10 vol % based on the total organic solution, the salt rejection rate was significantly reduced.

When Comparative Example 2 was reviewed, it could be confirmed that the amphiphilic solvent was included in not an organic solution, but an aqueous solution including an amine compound, the permeation flux was minimally improved.

When Comparative Examples 3 to 5 were reviewed, it could be confirmed that in the case where an amphiphilic solvent having a boiling point of less than 120° C. was used in an organic solution, the salt rejection rates were reduced or the permeation fluxes were minimally improved, as compared to the case where an amphiphilic solvent having a boiling point of 120° C. or more was used in an organic solution.

The initial salt rejection rates and the initial permeation fluxes of the water treatment separation membranes manufactured in Examples 4 and 6 and Comparative Examples 1, 3, and 6 were measured by the same method as the above-described method, and the results are shown in the following Table 2.

TABLE 2

| Classification | Non-polar solvent | Amphiphilic solvent (vol %) | Time for being left to stand at normal temperature (min) | Salt rejection rate (%) | Permeation flux (gallon/ft² · day) |
|---|---|---|---|---|---|
| Example 4 | Isopar G | PGMEA (1.0) | — | 99.05 | 52.15 |
| Example 6 | Isopar G | PGMEA (1.0) | 60 | 99.10 | 51.37 |
| Comparative Example 1 | Isopar G | — | — | 99.31 | 37.42 |
| Comparative Example 3 | Isopar G | Acetone (1.0) | — | 99.06 | 42.42 |
| Comparative Example 6 | Isopar G | Acetone (1.0) | 60 | 99.25 | 38.84 |

When the results of Table 2 are reviewed, it can be confirmed that in the case of Comparative Examples 3 and 6 in which an amphiphilic solvent having a boiling point of less than 120° C. (acetone, boiling point: 56° C.) is used as an amphiphilic solvent, when the time for the organic solution to be left to stand is prolonged as in Comparative Example 6, the amount of amphiphilic solvent in the solution is reduced, and as a result, the performance of a finally manufactured water treatment separation membrane is changed.

In contrast, it can be confirmed that in the case of Examples 4 and 6 in which an amphiphilic solvent having a boiling point of 120° C. or more is used as an amphiphilic solvent, the performance of the water treatment separation membrane less tends to deteriorate as the amount of amphiphilic solvent in the solution is decreased even though the time for the organic solution to be left to stand is prolonged as in Example 6.

Even though the exemplary embodiments of the present invention have been described in detail, the right scope of the present invention is not limited thereto, and it will be obvious to a person with ordinary skill in the art that various modifications and alterations are possible without departing from the technical spirit of the present invention described in the claims.

The invention claimed is:

1. A method for manufacturing a water treatment separation membrane, the method comprising:
    forming an aqueous solution layer comprising an amine compound on a porous support; and
    bringing an organic solution comprising an acyl halide compound into contact with on the aqueous solution layer to form a polyamide active layer,
    wherein the organic solution comprises a non-polar solvent and an amphiphilic solvent having a boiling point of 120° C. or more,
    wherein the amphiphilic solvent comprises one or more selected from the group consisting of propylene glycol monomethyl ether acetate, dipropylene glycol monomethyl ether acetate, and 1,3-butanediol diacetate, and
    wherein the amphiphilic solvent is comprised in an amount of 0.05 vol % to 10 vol % based on a total volume of the organic solution.

2. The method of claim 1, wherein the non-polar solvent is a hydrocarbon solvent having 6 to 13 carbon atoms.

* * * * *